United States Patent
Kurdziel et al.

(10) Patent No.: US 11,115,395 B2
(45) Date of Patent: Sep. 7, 2021

(54) CROSS-DOMAIN INFORMATION TRANSFER SYSTEM AND ASSOCIATED METHODS

(71) Applicant: HARRIS GLOBAL COMMUNICATIONS, INC., Albany, NY (US)

(72) Inventors: Michael T. Kurdziel, Rochester, NY (US); Steven M. Farris, Webster, NY (US); Peter Bajorski, Fairport, NY (US); Alan R. Kaminsky, Rochester, NY (US); Marcin Lukowiak, Rochester, NY (US); Stanislaw P. Radziszowski, West Henrietta, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 54 days.

(21) Appl. No.: 16/519,098

(22) Filed: Jul. 23, 2019

(65) Prior Publication Data

US 2021/0029097 A1   Jan. 28, 2021

(51) Int. Cl.
*H04L 29/06* (2006.01)
*H04L 9/06* (2006.01)
(Continued)

(52) U.S. Cl.
CPC ........ *H04L 63/0442* (2013.01); *H04L 9/0631* (2013.01); *H04L 9/083* (2013.01); *H04L 9/088* (2013.01); *H04L 9/3252* (2013.01)

(58) Field of Classification Search
None
See application file for complete search history.

(56) References Cited

U.S. PATENT DOCUMENTS

| 5,481,613 A | 1/1996 | Ford et al. |
| 8,634,563 B2 | 1/2014 | Vaikuntanathan et al. |

(Continued)

OTHER PUBLICATIONS

Kent, "IP encapsulating security payload (ESP)", The Internet Society, Dec. 2005, pp. 1-44.
(Continued)

*Primary Examiner* — Eleni A Shiferaw
*Assistant Examiner* — Bassam A Noaman
(74) *Attorney, Agent, or Firm* — Allen, Dyer, Doppelt + Gilchrist, P.A. Attorneys at Law

(57) ABSTRACT

A cross-domain information transfer system includes a key distribution center that generates private encryption keys and a signature key pair as a secret signing and secret verifying key for an attribute associated with a given domain. A sender device generates ciphertext from plaintext based upon the private encryption key, appends an attribute for a given domain to the ciphertext, generates ciphertext with a concealed attribute based upon the secret signing key and broadcasts the ciphertext with the concealed attribute. Domain gateway devices each receive a respective secret verifying key for an associated attribute, receive the ciphertext with the concealed attribute from the untrusted network, and use the secret verifying key to determine if the concealed attribute matches the attribute associated with the domain gateway device, and, when so, pass the ciphertext to at least one receiver device coupled with the domain gateway device.

12 Claims, 5 Drawing Sheets

(51) Int. Cl.
*H04L 9/08* (2006.01)
*H04L 9/32* (2006.01)

(56) References Cited

U.S. PATENT DOCUMENTS

| | | | | |
|---|---|---|---|---|
| 2003/0005317 | A1* | 1/2003 | Audebert | G06Q 20/40975 |
| | | | | 713/193 |
| 2007/0130084 | A1* | 6/2007 | Kay | H04L 63/12 |
| | | | | 705/67 |
| 2010/0011337 | A1* | 1/2010 | Young | G06F 8/20 |
| | | | | 717/104 |
| 2012/0314854 | A1 | 12/2012 | Waters | |
| 2012/0331300 | A1* | 12/2012 | Das | G06F 3/1454 |
| | | | | 713/176 |
| 2015/0172493 | A1* | 6/2015 | Anezaki | G06F 1/3234 |
| | | | | 358/1.13 |
| 2015/0222605 | A1 | 8/2015 | Ignatenko et al. | |
| 2018/0096137 | A1* | 4/2018 | Trostle | G06F 21/33 |
| 2020/0220898 | A1* | 7/2020 | Kumar | G06F 21/53 |
| 2020/0228346 | A1* | 7/2020 | Sakata | H04L 9/3247 |

OTHER PUBLICATIONS

Weis et al., "Multicast extensions to the security architecture for the internet protocol", IETF Trust, Nov. 2008, pp. 1-38.

Brochure for "BeOn® Mobile Application—Public Safety'S Most Advanced P25 Push-to-Talk Application," Harris Technology To Connect, Inform And Protect®, retrieved Jun. 2019 from https://www.harris.com/solution/beon-secure-group-communications-application, pp. 1-8.

Bethencourt et al. "Ciphertext-Policy Attribute-Based Encryption," 2007 IEEE Symposium on Security and Privacy (SP '07), May 2007, Berkeley, France, 16 pages.

* cited by examiner

CROSS-DOMAIN INFORMATION TRANSFER SYSTEM AND ASSOCIATED METHODS

FIELD OF THE INVENTION

The present invention relates to information systems, and, more particularly, to transferring information across domains using encryption keys.

BACKGROUND OF THE INVENTION

Information transfer across networks between different domains having various security levels is commonplace. The need for an interface that provides the ability to manually or automatically access and transfer information between domains without jeopardizing the data is becoming more important. A cross-domain approach provides the ability to manually or automatically access or transfer information between two or more different domains. These approaches offer integrated hardware and software that enable information transfer among incompatible security domains, allowing commercial, intelligence, and law enforcement operations to depend on the timely sharing of information. A cross-domain approach allows an isolated, critical network to exchange information with other networks and users without introducing a security threat that normally comes from network connectivity.

End-to-end encryption is a potential cross-domain approach, but network routers may be limited in their capacity to route fully encrypted data, since the endpoint addresses in the payload are also encrypted. To maintain efficient routing in many cross-domain information transfer systems, data payloads are encrypted, but the data addresses and destinations are not encrypted. As a result, packets in these systems are vulnerable to traffic flow analysis. An efficient cross-domain approach allows an isolated critical network to exchange information without introducing the security threats that normally come from network connectivity. Three elements that are common in cross-domain approaches may include: 1) data confidentiality imposed by hardware-enforced, one-way data transfer; 2) data integrity using filtering for viruses and Malware, including content examination utilities and high-to-low security transfer audited human reviews; and 3) data availability provided by security-hardened operating systems, role-based administration access, and redundant hardware.

For example, a cross-domain information transfer system for transferring data from a low to high security domain may include an anti-virus scanning before transfer. Transfer from high to low security domains, however, usually requires complex data analysis, including time-consuming human review, where individuals examine and prove a document before release. One-way data transfer systems, such as data diodes, are sometimes used to move information from low security domains to higher security enclaves, while ensuring information will not escape. Some cross-domain approaches may include a high assurance guard, for example, a multilevel secure device that communicates between different security domains and runs multiple virtual machines or physical machines.

One or more subsystems may be included for a lower classification, and one or more subsystems may be included for a higher classification. Some devices operate an acknowledgment management software system that examines data and rejects higher classified data. These devices, however, may require complex and computationally intensive digital signature algorithms and may not be computationally efficient, and for this reason, often they are not implemented with battery-operated devices, e.g., radios used by first responders or by other commercial operators.

SUMMARY OF THE INVENTION

In general, a cross-domain information transfer system may include a key distribution center configured to generate a plurality of private encryption keys, and a respective signature key pair for an attribute from among a plurality of different attributes. Each attribute may be associated with a given domain among a plurality of different domains, and each signature key pair may comprise a secret signing key and a secret verifying key. A sender device may be configured to receive a respective private encryption key and generate ciphertext from plaintext based upon the private encryption key, append a respective attribute for a given domain to the ciphertext, receive a respective signing key and generate ciphertext with a concealed attribute from the ciphertext with the appended attribute based upon the secret signing key, and broadcast the ciphertext with the concealed attribute through an untrusted network.

A plurality of domain gateway devices are in communication with the untrusted network. Each domain gateway device may have a respective attribute associated therewith and configured to receive a respective secret verifying key, receive the ciphertext with the concealed attribute from the untrusted network, and use the secret verifying key to determine if the concealed attribute matches the attribute associated with the domain gateway device, and, when so, pass the ciphertext to at least one receiver device coupled with the domain gateway device.

In some embodiments, the plurality of different domains may have different security levels associated therewith. At least one receiver device may be configured to decrypt the ciphertext into plaintext based upon the private encryption key. Each attribute may comprise a binary attribute. Each private encryption key may be based upon an Advanced Encryption Standard (AES). Each signature key pair may be based upon an the Elliptic Curve Digital Signature Algorithm (ECDSA). The sender device may be configured to process information to generate multiple broadcasts to different domains.

Another aspect is directed to a method of cross-domain information transfer that may comprise operating a sender device to receive a respective private encryption key and generate ciphertext from plaintext based upon the private encryption key, append a respective attribute for a given domain to the ciphertext, receive a respective signing key and generate ciphertext with a concealed attribute from the ciphertext with the appended attribute based upon the secret signing key, and broadcast the ciphertext with the concealed attribute. The method further includes operating a plurality of domain gateway devices, each domain gateway device having a respective attribute associated therewith. Operating each domain gateway device may comprise receiving a respective secret verifying key, receiving the ciphertext with the concealed attribute from the untrusted network, and using the secret verifying key to determine if the concealed attribute matches the attribute associated with the domain gateway device, and, when so, pass the ciphertext to at least one receiver device coupled with the domain gateway device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
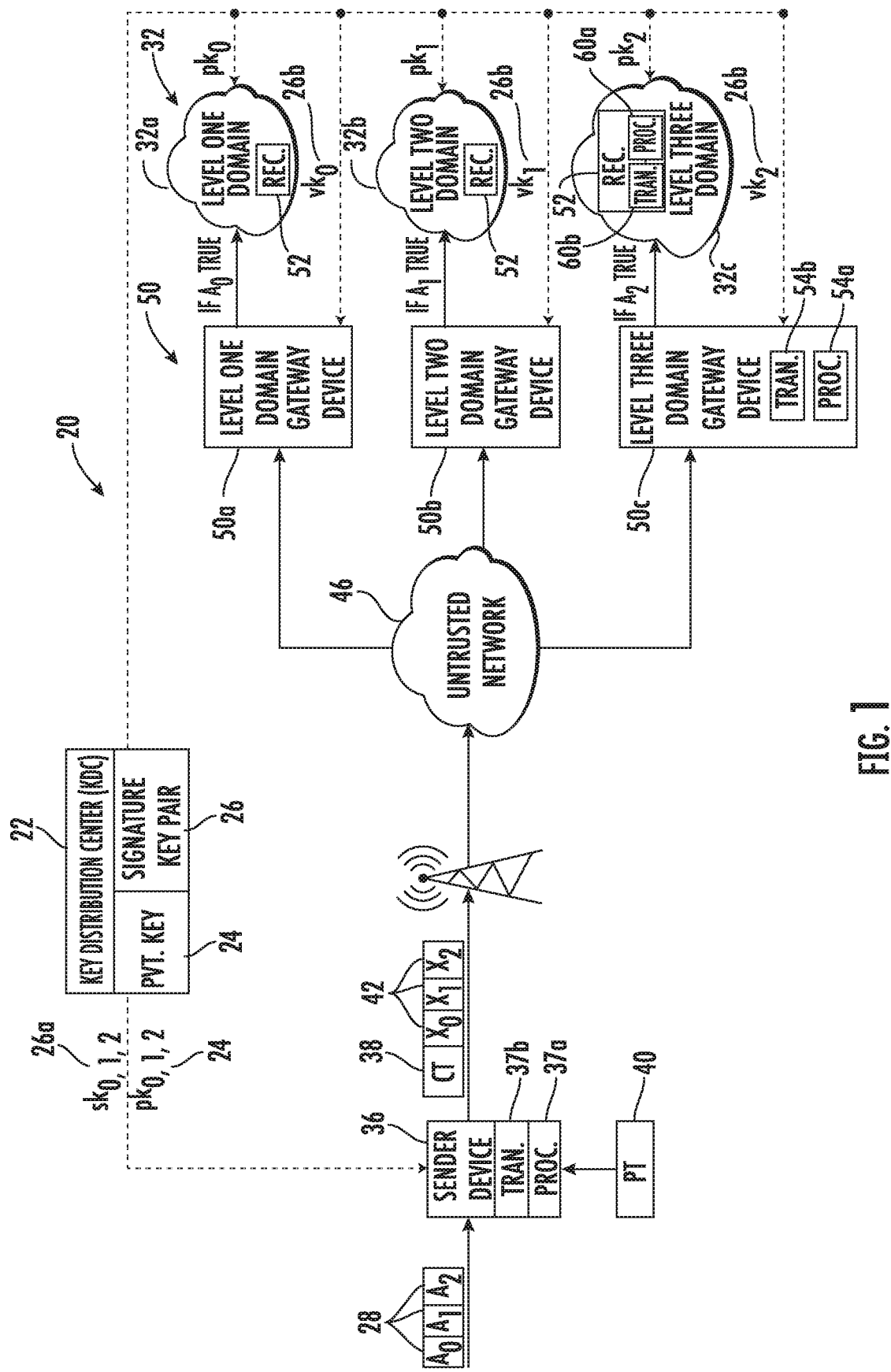
FIG. 1 is a block diagram of the cross-domain information transfer system according to the invention.

Referring initially to FIG. 1, a cross-domain information transfer system is illustrated generally at 20 and includes a Key Distribution Center (KDC) 22 that is configured to generate a plurality of private encryption keys 24, given the designation $pk_{0, 1, 2}$, i.e., the first private encryption key corresponding to $pk_0$. The Key Distribution Center also generates a respective signature key pair 26 for an attribute 28 from among a plurality of different attributes, with each attribute associated with a given domain among a plurality of different domains 32.

In FIG. 1, attributes 28 are each designated with the letter "A" and a subscript numerical indicia, indicating a separate attribute, such as $A_0$, $A_1$, and $A_2$. Each signature key pair 26 includes a secret signing key 26a and a secret verifying key 26b. In this example, each signing key 26a is given a designation $sk_i$ with a numerical indicia as a subscript for each individual secret signing key, such as $sk_0$, $sk_1$, and $sk_2$, and each secret verifying key 26b is given a designation $vk_i$ with a numerical subscript, such as $vk_0$, $pk_1$, and $vk_2$. Three different domains 32 are illustrated, e.g., a Level One domain 32a, Level Two domain 32b, and a Level Three domain 32a.

A sender device 36 includes basic components of a processor 37a and transceiver 37b, and is configured to receive a respective private encryption key 24, e.g., $pk_i$, and generate ciphertext (CT) 38 from plaintext (PT) 40 based upon the private encryption key. The private encryption key 24 may be a symmetric key enabling block cipher encryption to form the ciphertext 38. As illustrated in greater detail in FIG. 2, the sender device 36 appends ($CT\|A_i$) 37c a respective attribute ($A_i$) for a given domain 32, such as the Level Three domain 32c, to the ciphertext 38. As will be explained in greater detail below, the sender device 36 receives a respective secret signing key 26a and generates the ciphertext 38 with one or more concealed attributes 42 ($X_0$, $X_1$, $X_2$) from the ciphertext based upon the secret signing key.

Referring again to FIG. 1, the sender device 36 broadcasts the ciphertext 38 (CT) with one or more concealed attributes 42, e.g., CT and $X_0$, $X_1$, and $X_2$, to an untrusted network 46. A plurality of domain gateway devices 50 are in communication with the untrusted network 46. Each domain gateway device 50 has a respective attribute 28 ($A_0$, $A_1$, and $A_2$) associated therewith and receives a respective secret verifying key 26b, and receives a ciphertext 38 with the concealed attribute 42 from the untrusted network 46. As will be explained in greater detail below, each domain gateway device 50 uses its secret verifying key 26b to determine if the concealed attribute 42 matches the attribute associated with the domain gateway device, and, when so, passes the ciphertext 38 to at least one receiver device 52 coupled with the domain gateway device. Three domain gateway devices 50 are illustrated with the first domain gateway device 50a associated with the Level One domain 32a, and the Level Two and Level Three domain gateway devices 50b, 50c associated with the respective domains 32b, 32c.

Each domain 32 has at least one receiver device 52 that is configured to decrypt the ciphertext 38 into plaintext 40 based upon the private encryption key 24, such as the $pk_2$ that the receiver device 52 in the top secret domain employs. The corresponding secret verifying key 26b ($vk_2$) had been transmitted to that third domain gateway device 50c, which operates as the gateway for the top secret domain 32c and any receiver devices 52 contained in that top secret domain. Each domain gateway device 50 may include a processor 54a and transceiver 54b as shown in the larger block diagram of the Level Three domain gateway device 50c. Each receiver device 52 may include a processor 60a and transceiver 60b associated therewith as shown in the enlarged block diagram of the receiver device associated with the Level Three domain 32c and connected to the Level Three domain gateway device 50c. The sender device 36 is configured to process information and generate multiple broadcasts to different domains 32, such as showing the three transmissions to the domain gateway devices 50a, 50b, 50c in FIG. 1.

In an example, the private encryption key 24 may be based upon an Advanced Encryption Standard (AES) and the signature key pair 26 may be based upon an Elliptic Curve Digital Signature Algorithm (ECDSA). Each attribute 28 may include a binary attribute, such as illustrated by the $A_i$ (0 or 1) (FIG. 2), and used to form the concealed attribute $X_i$ where the attribute is appended to the ciphertext 38, i.e., $CT\|A_i$ at 37c.

Figure 3:
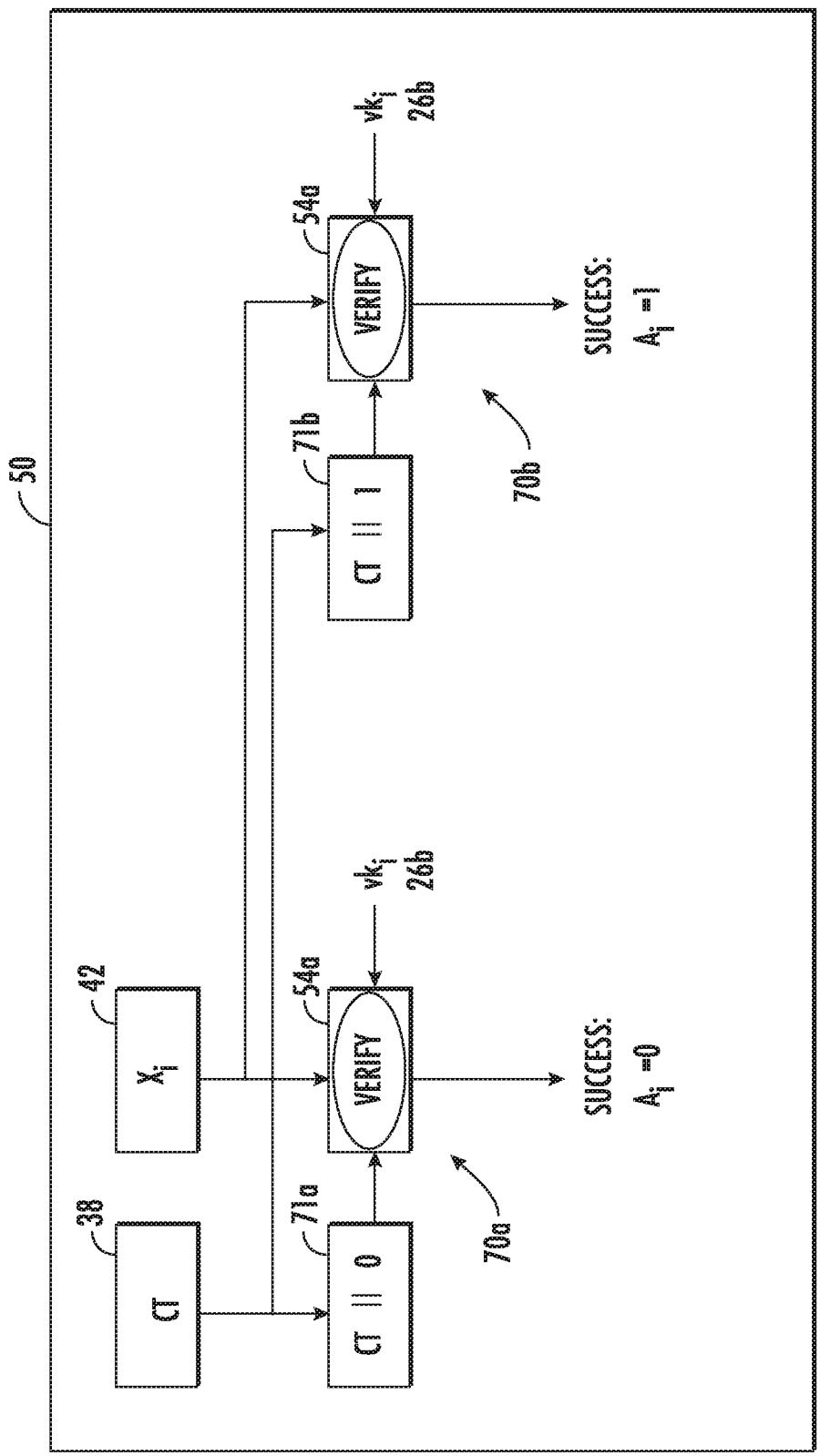
FIG. 3 is a block diagram of a domain gateway device of FIG. 1.

Referring to FIG. 3, a domain gateway device 50 may have two verifications 70a, 70b as will be explained in greater detail below, for example, based on appending to the ciphertext (CT) 38 a logical 0 in the first verification i.e., $CT\|0$ at 71a. When a binary 0 is obtained after the secret verifying key 26b is applied in the first verification 70a, the domain gateway device 50 would not pass the ciphertext 38 to at least one receiver device 52 coupled with the domain gateway device 50. If a logical 1 is obtained after appending a logical 1 to the ciphertext 38 in the second verification 70b, i.e., $CT\|1$ at 71b, and verifying with the secret verifying key 26b, then the ciphertext is passed to at least one receiver device 52 coupled with the respective domain gateway device 50.

Figure 4:
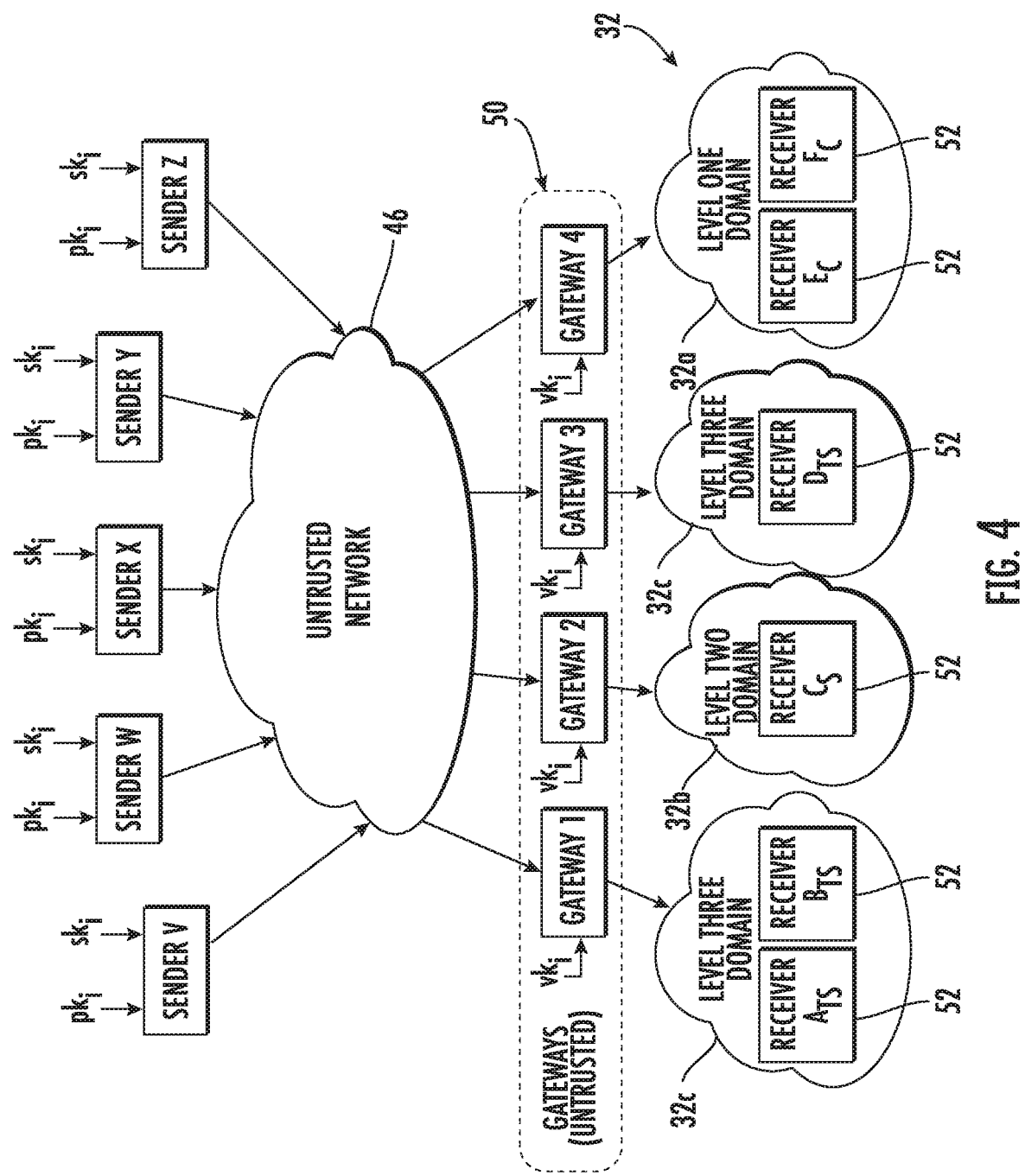
FIG. 4 is another block diagram of the cross-domain information transfer system of FIG. 1, showing a plurality of sender devices.

Referring now to the block diagram of FIG. 4 for the cross-domain information transfer system 20, more than one sender device 36 may be used, e.g., sender devices labeled V, W, X, Y, and Z, with each sender device receiving a respective private encryption key $pk_i$ 24 for generating ciphertexts 38 from plaintext 40 based upon a received private encryption key. Each sender device 36 will append a respective attribute 28 for a given domain 32 to the ciphertext 38 and receive a respective secret signing key $sk_i$ 26a and generate ciphertext with a concealed attribute 42 from the ciphertext based upon the secret signing key. Each sender device 36 broadcasts its ciphertext 38 with the concealed attribute 42 through the untrusted network 46 to each of the domain gateway devices 50. Each domain gateway device 50 has already received its respective secret verifying key $vk_i$ 26b and receives the ciphertext 38 with the concealed attribute 42 from the untrusted network 46 and uses the secret verifying key to determine if the concealed attribute 42 matches the attribute associated with the domain gateway device 50, and, when so, pass the ciphertext 38 to at least one receiver device 52 coupled with the domain gateway device 56. Each domain 32 may have more than one receiver device 52, such as shown in the Level Three domain 32c and Level One domain 32a, each shown with two receiver devices ($A_{TS}$, $B_{TS}$ and $E_c$, $F_c$) respectively.

Figure 5:
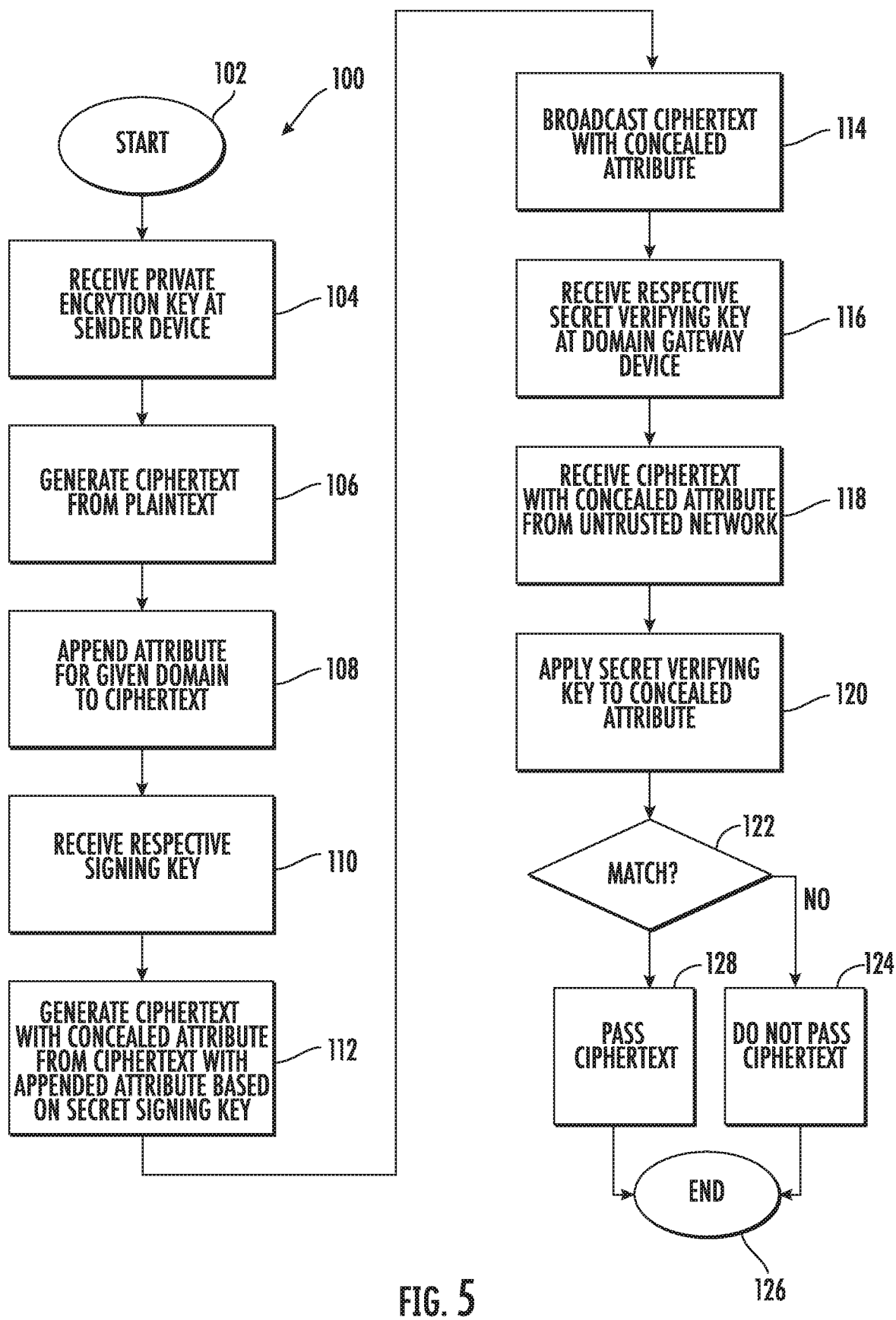
FIG. 5 is a high-level flowchart of a method for operating the cross-domain information transfer system of FIG. 1.

Referring now to FIG. 5, there is illustrated a flowchart showing a sequence of steps that may be used for operating the cross-domain information transfer system 20 as shown in FIG. 1, with the method indicated generally at 100. The process starts at Block 102. The sender device 36 receives a respective private encryption key 24 (Block 104). The sender device 36 generates ciphertext 38 from plaintext 40 based upon the private encryption key (Block 106). The sender device 36 appends a respective attribute 28 for a given domain 32 to the ciphertext 38 (Block 108), receives a respective secret signing key 26a (Block 110), and generates ciphertext with a concealed attribute 42 from the ciphertext with the appended attribute based upon the secret signing key 26a (Block 112). The sender device 36 broadcasts the ciphertext 38 with the concealed attribute 42 (Block 114). Each domain gateway device 50 receives a respective secret verifying key 22b (Block 116) and receives the ciphertext 38 with the concealed attribute 42 from the untrusted network 46 (Block 118). The secret verifying key 26b is applied to the concealed attribute 42 (Block 120) and a determination made if there is a match of the attribute 28 associated with the respective domain gateway device 50 (Block 122). If no, the domain gateway device 50 will not pass the ciphertext 38 to at least one receiver device 52 coupled with the domain gateway device 50 (Block 124), and the process ends (Block 126). If yes, then the domain gateway device 50 passes the ciphertext 38 to at least one receiver device 52 coupled with the domain gateway device 50 (Block 128) and the process ends (Block 126).

The cross-domain information transfer system 20 as described has security benefits because a domain gateway device 50 may not determine the plaintext 40 because it lacks the private encryption key 24 and it may not determine any attribute 28 value that is not its own because it does not have the secret verifying key 26b that belongs to other respective domain gateway devices. A domain gateway device 50 may not forge or offer altered ciphertexts 38 or concealed attributes 42 because it lacks the secret signing key 26a used to form the concealed attributes and cannot deduce the secret signing key as a digital signature. An intruder may not determine the plaintext 40 because the intruder lacks the private encryption key 24 and may not determine the value of any attribute 28 because the intruder lacks any secret verifying keys 26b. The intruder may not forge or alter ciphertexts 38 or concealed attributes 42 because the intruder lacks the secret signing key 26a.

The cross-domain information transfer system 20 as described is applicable to various applications, including the communication of sensitive sensor data over heterogeneous networks. For example, in a commercial airline, the flight control data could be sent to a sensitive domain in the aircraft, such as a pilot navigation system, while a more limited set of flight control data may be sent to a less secure domain as part of an in-flight entertainment system for displaying the location of the aircraft to the passengers.

Figure 2:
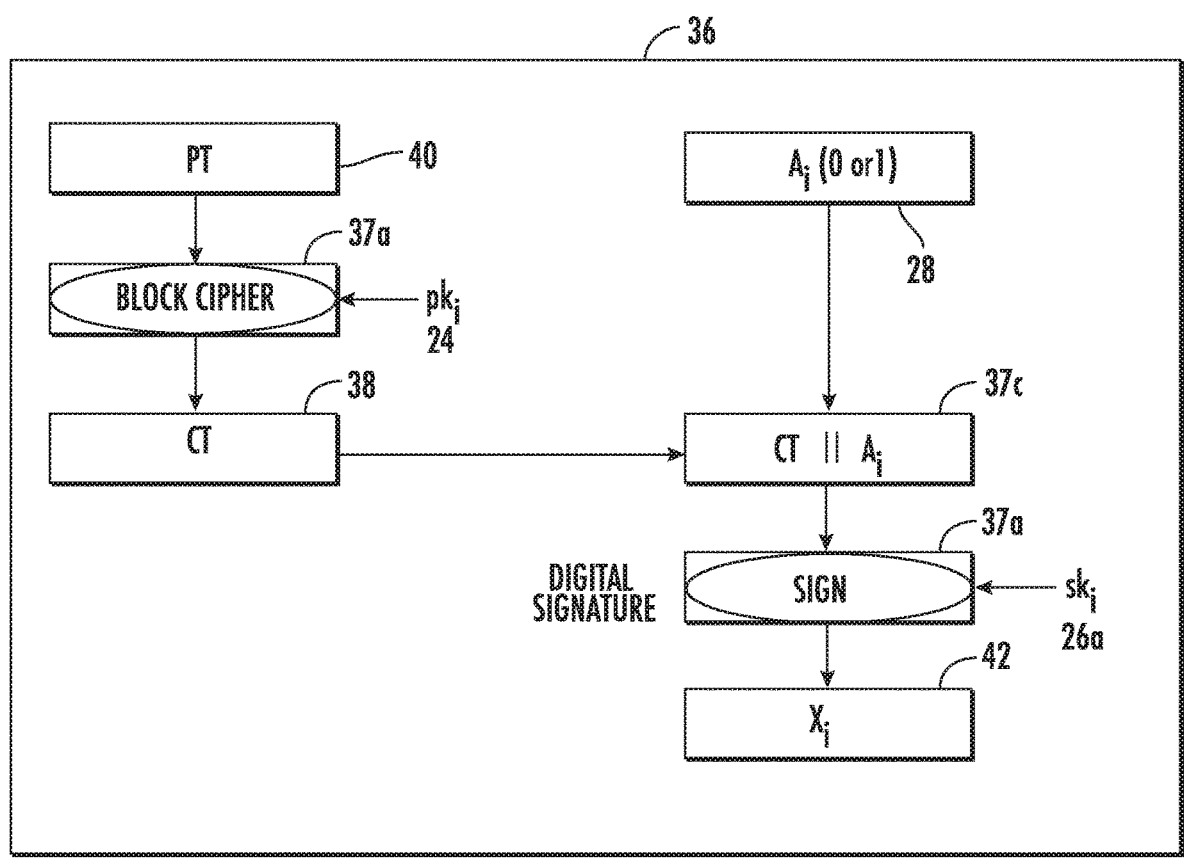
FIG. 2 is a block diagram of the sender device of FIG. 1.

In operation, a sender device 36 generates a sensitive message as plaintext 40 and using a symmetric or block cipher, i.e., the private encryption key $pk_i$ 24, and generates in its processor 37c a ciphertext 38 from the plaintext. As shown in the example of FIG. 2, the sender device 36 attaches one or more Boolean-valued attributes 28 to the ciphertext 38 at CT||$A_i$ 37c and conceals the attribute values using the secret signing key $sk_i$ 26a as described in greater detail below.

A domain gateway device 50 receives the ciphertext 38 along with the attached, concealed attributes 42. A particular receiver device 52 has the secret verifying key 26b to process the ciphertext 38 and attached concealed attributes 42 to learn the true/false value of a particular attribute. The domain gateway device 50 cannot learn the true/false value of any attribute 28 for which that particular domain gateway device is not authorized, i.e., it does not have the particular secret verifying key 26b. As a result, a domain gateway device 50 cannot correctly attach any concealed attributes 42 to any ciphertexts 38. A domain gateway device 50 cannot learn any plaintext.

An intruder or hacker to the system 20 cannot learn any plaintext 40 since the intruder does not have the private encryption key 24 and cannot correctly attach any concealed attributes 42 to any ciphertexts 38. An intruder cannot learn the true/false values of any attributes 28. If an intruder alters a ciphertext 38 and/or its concealed attributes 42, it will not be possible for any domain gateway device 50 to learn the attribute values and as a result, the intruder's attack becomes, in effect, a denial-of-service attack. That attack, however, does not break the security of the system 20.

As noted before, the encryption protocol for the signature key pair 26 includes the secret signing key 26a and secret verifying key 26b and relies on a digital signature algorithm, e.g., the Elliptic Curve Digital Signature Algorithm (ECDSA) defined in FIPS PUB 186-4 Digital Signature Standard (DSS) with Curve P-192. As noted before, the private key may use an Advanced Encryption Standard (AES) such as AES-128-GCM (Galois/Counter Mode) and combines Galois field multiplication with a counter mode of operation for block ciphers.

The Key Distribution Center (KDC) 22 is a trusted key source generating the private encryption key 24 and a signature key pair 26 for each attribute Ai, i.e., the secret signing key 26a ($sk_i$) and secret verifying key 26b ($vk_i$). Both the secret signing key 26a and the secret verifying key 26b are both maintained secret. The secret verifying key 26a in this system 20 is not made public, as is often the case for signature key pairs. The key distribution center 22 securely sends each attribute's secret signing key 26a to each sender device 36. The key distribution center 22 securely sends each attribute's secret verifying key 26b to each domain gateway device 50 that is authorized to learn the true/false value of that attribute 28 corresponding to a specific domain 32 when a binary attribute is used.

A sender device 36 may generate a ciphertext 38 (C) and determine the value of each attribute Ai, and may generate each concealed attribute Xi as follows:
If the value of Ai is false:
    Xi=Sign (C||0, $sk_i$);
    Else: Xi=Sign (C||1, $sk_i$).

The sender device 36 attaches the concealed attributes Xi to the ciphertext 38 (C) and transmits the message. With ECDSA/P-192, each concealed attribute 42 as a signature occupies 384 bits=48 bytes. A domain gateway device 50 receives a ciphertext 38 (C) along with its attached concealed attributes Xi. The domain gateway device 50 that contains the complement secret verifying key 26b to the secret signing key 26a is authorized to learn the true/false value of a particular attribute Ai when a binary attribute is used. The domain gateway device 50 operates as follows:

If Verify (C||0, Xi, $vk_i$) succeeds: Ai is false;

Else if Verify (C||1, Xi, $vk_i$) succeeds: Ai is true

Else: Error, Ai is unknown.

Because no domain gateway devices 50 or intruder has the private encryption key 24 used to generate the ciphertexts 38, no other domain gateway device 50 or intruder, such as a hacker, can learn the plaintexts 40.

If a domain gateway device 50 or intruder is not authorized to learn the true/false value of Ai, then that domain gateway device or intruder will not have $vk_i$ as the secret verifying key 26b, and that domain gateway device or intruder will not be able to carry out the above computation. If an intruder tries to learn the value of an attribute 28 using the wrong secret verifying key 26b, both signature verifications for Xi will fail.

Because no domain gateway device 50 or intruder, such as a hacker, has the secret signing key $sk_i$ for any attribute, no domain gateway device 50 or intruder can generate a correct concealed value Xi for any attribute 28. Also, it is not possible to derive the secret signing key $sk_i$ 26a from the secret verifying key $vk_i$ 26b. If an intruder tries to generate Xi using the wrong secret signing key $sk_i$ 26a, then both signature verifications for Xi will fail. If an intruder alters a ciphertext 38 (C) or a concealed attribute Xi, both signature verifications for Xi will fail.

Because the ECDSA algorithm used for the signature key pair 26 includes a random ephemeral value in every signature computation, the concealed attribute value Xi may be different in every message, even if the attribute value Ai is the same. Therefore, no intruder or domain gateway device 50 not having the secret verifying key 26b for the attribute 28 will be able to correlate the concealed attribute values with the actual attribute values.

There now follows an example description for a sensitive document distribution. In this example, the ciphertexts 38 are encrypted sensitive documents. There are four Boolean attributes: 1) an A1 document may be sent to a Level One domain as a network; 2) an A2 document may be sent on a Level Two domain as a network; 3) an A3 document may be sent on a Level Three domain as a network; 4) an A4 document may be sent on another level domain, with a special access program as a network.

The sender devices 36 create documents as ciphertexts 38. A sender device 36 that creates a document at a particular secrecy level attaches concealed attributes to the ciphertext as follows:

Unclassified document—A1 true, A2 true, A3 true, A4 true;

Secret document—A1 false, A2 true, A3 true, A4 true;

Top Secret document—A1 false, A2 false, A3 true, A4 true;

Top Secret document with special access—A1 false, A2 false, A3 false, A4 true.

The domain gateway devices 50 operate with the receiver devices for the domains 32 as networks. Each domain 32 as a network has a security level. A specific domain gateway device 50 for a device 32 determines whether a specific document is allowed to be sent on a specific domain as a network. The domain gateway device 50 receives and processes data within its processor 54a and determines the true/false value of the attribute 28 associated with the secrecy level of the specific domain 32 and allows the document to be sent on the domain 32 as the network only if the attribute is true.

In this example, multi-valued attributes may be used so that a number of attributes may be used, i.e., $A_0$, $A_1$, $A_2$, etc. The technique as described can be extended to attributes with "N" possible discrete values (N>2). To create a concealed attribute, sign (C||0), (C||1), (C||2), . . . or (C||N−1) as appropriate. Determining the actual attribute value from the concealed attribute value takes longer, e.g., up to N signature verifications may have to be performed. In some cases, it may be possible to apply functional/homomorphic encryption.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A cross-domain information transfer system comprising:

a key distribution center configured to generate a plurality of private encryption keys, and a respective signature key pair for an attribute from among a plurality of different attributes, wherein each attribute comprises a binary attribute, each signature key pair and attribute associated with a given domain among a plurality of different domains, and each signature key pair comprising a secret signing key and a secret verifying key;

a sender device, among a plurality of sender devices, comprising a processor and transceiver coupled thereto, and configured to receive a respective private encryption key and generate ciphertext from plaintext based upon the private encryption key, append a respective attribute for a given domain to the ciphertext, receive a respective secret signing key and generate ciphertext with a concealed attribute from the ciphertext with the appended attribute based upon the secret signing key, and broadcast the ciphertext with the concealed attribute through an untrusted network; and a plurality of domain gateway devices in communication with the untrusted network, wherein the plurality of different domains have different security levels associated therewith, each domain gateway device is not capable of determining the plaintext and comprising a processor and transceiver coupled thereto, and having a respective attribute associated therewith and configured to receive a respective secret verifying key, receive the ciphertext with the concealed attribute from the untrusted network, and use the secret verifying key to determine if the concealed attribute matches the attribute associated with the domain gateway device, and, when so, pass the ciphertext to at least one receiver device coupled with the domain gateway device, wherein the at least one receiver device comprises a processor and transceiver coupled thereto, and configured to decrypt the ciphertext into plaintext based upon the private encryption key.

2. The cross-domain information transfer system of claim 1 wherein each private encryption key is based upon an Advanced Encryption Standard (AES).

3. The cross-domain information transfer system of claim 1 wherein each signature key pair is based upon an Elliptic Curve Digital Signature Algorithm (ECDSA).

4. The cross-domain information transfer system of claim 1 wherein the sender device is configured to process information to generate multiple broadcasts to different domains.

5. A cross-domain information transfer system comprising:
- a sender device, among a plurality of sender devices, comprising a processor and transceiver coupled thereto and configured to receive a respective private encryption key and generate ciphertext from plaintext based upon the private encryption key,
- append a respective attribute for a given domain among a plurality of different domains to the ciphertext, wherein each attribute comprises a binary attribute,
- receive a respective secret signing key and generate ciphertext with a concealed attribute from the ciphertext with the appended attribute based upon the secret signing key, and broadcast the ciphertext with the concealed attribute; and a plurality of domain gateway devices,
- wherein the plurality of different domains have different security levels associated therewith,
- each domain gateway device is not capable of determining the plaintext and comprising a processor and transceiver coupled thereto, and having a respective attribute associated therewith and configured to receive a respective secret verifying key associated with each domain,
- receive the ciphertext with the concealed attribute from the untrusted network, and use the secret verifying key to determine if the concealed attribute matches the attribute associated with the domain gateway device, and, when so, pass the ciphertext to at least one receiver device coupled with the domain gateway device;
- wherein the at least one receiver device comprises a processor and transceiver coupled thereto, and configured to decrypt the ciphertext into plaintext based upon the private encryption key.

6. The cross-domain information transfer system of claim 5 wherein each private encryption key is based upon an Advanced Encryption Standard (AES).

7. The cross-domain information transfer system of claim 5 wherein each signature key pair is based upon an Elliptic Curve Digital Signature Algorithm (ECDSA).

8. The cross-domain information transfer system of claim 5 wherein the sender device is configured to process information to generate multiple broadcasts to different domains.

9. A method of cross-domain information transfer comprising:
- operate a sender device, among a plurality of sender devices, comprising a processor and transceiver coupled thereto to receive a respective private encryption key and generate ciphertext from plaintext based upon the private encryption key,
- append a respective attribute for a given domain among a plurality of different domains to the ciphertext, wherein each attribute comprises a binary attribute,
- receive a respective secret signing key and generate ciphertext with a concealed attribute from the ciphertext with the appended attribute based upon the secret signing key, and
- broadcast the ciphertext with the concealed attribute; and operate a plurality of domain gateway devices, wherein the plurality of different domains have different security levels associated therewith,
- each domain gateway device is not capable of determining the plaintext and comprising a processor and transceiver coupled thereto, and having a respective attribute associated therewith,
- wherein operating each domain gateway device comprises receiving a respective secret verifying key,
- receiving the ciphertext with the concealed attribute from the untrusted network, and
- using the secret verifying key to determine when the concealed attribute matches the attribute associated with the domain gateway device, and, when so, pass the ciphertext to at least one receiver device coupled with the domain gateway device, wherein the at least one receiver device comprises a processor and transceiver coupled thereto, and configured to decrypt the ciphertext into plaintext based upon the private encryption key.

10. The method of claim 9 wherein each private encryption key is based upon an Advanced Encryption Standard (AES).

11. The method of claim 9 wherein each signature key pair is based upon an Elliptic Curve Digital Signature Algorithm (ECDSA).

12. The method of claim 9 wherein operating the sender device comprises processing information to generate multiple broadcasts to different domains.

* * * * *